United States Patent
Bharucha et al.

(10) Patent No.: US 6,345,056 B1
(45) Date of Patent: *Feb. 5, 2002

(54) METHOD AND APPARATUS FOR TRANSMITTING COMPRESSED PACKETIZED VOICE OVER ATM

(75) Inventors: Behram H. Bharucha, Millburn; James Frederick Bradley, Middletown; Thomas P. Chu, Englishtown, all of NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/036,782

(22) Filed: Mar. 9, 1998

(51) Int. Cl.[7] .................................................. H04L 3/16
(52) U.S. Cl. ....................................................... 370/474
(58) Field of Search ................................ 370/465, 395, 370/389, 397, 399, 595, 468, 469, 470, 471, 472, 474, 475, 476, 290, 350, 466, 351, 352, 254; 375/232, 222, 233, 220, 242, 241, 244, 298; 704/270

(56) References Cited

U.S. PATENT DOCUMENTS 5,115,429 A     5/1992  Hluchyj et al.
5,864,554 A  *  1/1999  Rostoker et al. ............ 370/466
6,009,100 A  * 12/1999  Gausmann et al. ......... 370/466
6,014,381 A  *  1/2000  Troxel et al. ................ 370/466

FOREIGN PATENT DOCUMENTS

EP          0 827 305 A1     3/1998

OTHER PUBLICATIONS

Sato et al, "Variable Rate Speech Coding and Network Delay Analysis for Universal Transport Network", IEEE Infocom '88, The Conference on Computer Communications, Proceedings, Seventh Annual Joint Conference of the IEEE Computer and Communications Societies, "Networks: Evolution or Revolution?", Mar. 27–31, 1988, New Orleans, Louisiana, USA.

European Search Report, Mar. 3, 2000, EP 99 30 1691.4 – 2209–.

* cited by examiner

Primary Examiner—Dang Ton
(74) Attorney, Agent, or Firm—Kenyon & Kenyon

(57) ABSTRACT

A system transmits compressed voice packets over ATM. The system receives a plurality of voice data units and an encoding rule for each voice data unit. A packet is formed from the received data units. The packet includes a header. The header includes the amount of data units in the packet, and the encoding rule for each packet. The packet is then placed in an ATM cell which is transmitted on an ATM virtual channel. The ATM cell includes at most one packet.

27 Claims, 2 Drawing Sheets

METHOD AND APPARATUS FOR TRANSMITTING COMPRESSED PACKETIZED VOICE OVER ATM

FIELD OF THE INVENTION

The present invention is directed to digital voice communications. More particularly, the present invention is directed to a method and apparatus for transmitting compressed packetized voice over asynchronous transfer mode.

BACKGROUND OF THE INVENTION

Asynchronous Transfer Mode ("ATM") is based on the switching and multiplexing technique selected by the International Telecommunication Union ("ITU") for the broadband access for the Integrated Services Digital Network ("ISDN"). ATM utilizes a fixed-size packet, referred to as an ATM cell. Each ATM cell is 53 octets (one octet equals one byte) long and is divided into a 5 octet header and 48 octet information field.

The ITU has further defined an ATM adaptation layer ("AAL"). The AAL is the upper layer of the ATM layer and is responsible for converting user information from higher layers into a 48 octet payload field while the ATM cell layer adds the 5 octet header to make the 53 octet ATM cell. A family of AALs, AAL1 through AAL5, has been defined to handle diverse user applications. The AAL is usually subdivided into two parts: the Common Part Convergence Sub-layer ("CPCS") and the Service-Specific Convergence Sub-layer ("SSCS "). The SSCS defines formatting for different applications onto ATM cells.

One increasingly popular use of ATM is to transmit voice packets during telephone calls. In some networks, uncompressed voice packets are transmitted. A single uncompressed voice channel typically requires a bandwidth of 64 Kbps. However, various methods are used to compress voice in order to reduce the bandwidth requirements. For example, ITU G.728 voice coders typically compress voice to 16 Kbps. Of course, as the voice is more and more compressed, the reproduced voice quality is somewhat degraded.

When ATM is used to transmit voice telephone calls, multiple telephone calls are usually multiplexed onto a single physical link. For example, if 30 voice calls were multiplexed on a single physical link, and voice compression is used so that each voice call transmits at 16 Kbps, the total bandwidth required would be 480 Kbps (30×16 Kbps) plus overhead.

Besides compression, some telecommunication systems suppress silence during a telephone call in order to further reduce the bandwidth. In other words, if there is silence during a telephone conversation, the silence is not transmitted and the required bandwidth is temporarily reduced. When 30 voice calls are multiplexed together as described above, at any given moment approximately 15 voice calls require bandwidth while the other 15 voice calls consist of silence that can be suppressed. Thus, in implementing the 30 voice call system, only 240 Kbps (15×16 Kbps) may typically be required. However, if only 240 Kbps is allocated, a problem exists during periods when over 15 voice calls at once are in active conversation (i.e., no silence) and more than 240 Kbps of bandwidth is temporarily needed.

One known way to solve this problem is for the system to throw away voice packets (i.e., not transmit selected packets) during the periods when the increased bandwidth is required. However, this will cause the received voice quality to be severely degraded during those periods. Another way to solve the problem is to temporarily "down-speed" the amount of compression (i.e., the compression speed) during the periods when increased bandwidth is required. For example, some G.728 coders down-speed to 12.8 Kbps and 9.6 Kbps during periods of congestion. Using this method, the degradation of the received voice signal is minimized compared with dropping packets. When increased bandwidth is no longer required, the coder can "up-speed" back to its nominal speed of 16 Kbps.

One method for forming and transmitting voice packets that can accommodate down-speeding and up-speeding of voice compression has been proposed by the ITU. This method is referred to as the "I.trunk Transmitter Procedures for Voice Service" ("I.trunk"). I.trunk builds on AAL2 which is an AAL that supports variable size packets, sometimes referred to as "mini-packets." With I.trunk, whenever a compression speed changes, due to either down-speeding or up-speeding, the packet that is forming is cut off and a new packet is formed. Therefore, each packet is homogenous because each packet contains a single type of compression. Multiple AAL2 packets are included in one ATM cell.

One problem with I.trunk is that the mini-packets require two levels of switching for a large network. One layer of switching is the ATM cell layer. A second layer of switching is the AAL2 packet within the ATM cell layer, since I.trunk places multiple packets in each ATM cell. However, two layers of switching requires more complicated and more expensive equipment on an ATM network.

Based on the foregoing, there is a need for a method and apparatus for forming and transmitting voice packets over ATM cells that can accommodate down-speeding and up-speeding of voice compression without requiring "two-layer" switching and can enable the ATM cell to be efficiently packed.

SUMMARY OF THE INVENTION

One embodiment of the present invention is a system for transmitting compressed voice packets over ATM. The system receives a plurality of voice data units and an encoding rule for each voice data unit. A packet is formed from the received data units. The packet includes a header. The header includes the amount of data units in the packet, and the encoding rule for each packet. The packet is then placed in an ATM cell which is transmitted on an ATM virtual channel. The ATM cell includes at most one packet. To achieve high packing efficiency, the ATM cell contains as many data units as possible, even when the data units are of different types.

The present invention allows a single packet to include data units formed with different encoding rules (i.e., a mixed mode packet). This accommodates the dynamic nature of up-speeding and down-speeding. Further, the present invention does not require two-layer switching because the ATM cell includes only one packet.

DETAILED DESCRIPTION

One embodiment of the present invention is a packet formatter that formats digitized speech data units into a single packet. The packet can include data units that were digitized using different encoding rules (i.e., different types of compression). A header is included that describes the encoding rule for each data unit. One packet and an ATM header comprise an ATM cell. No more than one packet can be included in each ATM cell, and the packet can be homogenous or mixed mode.

Figure 1:
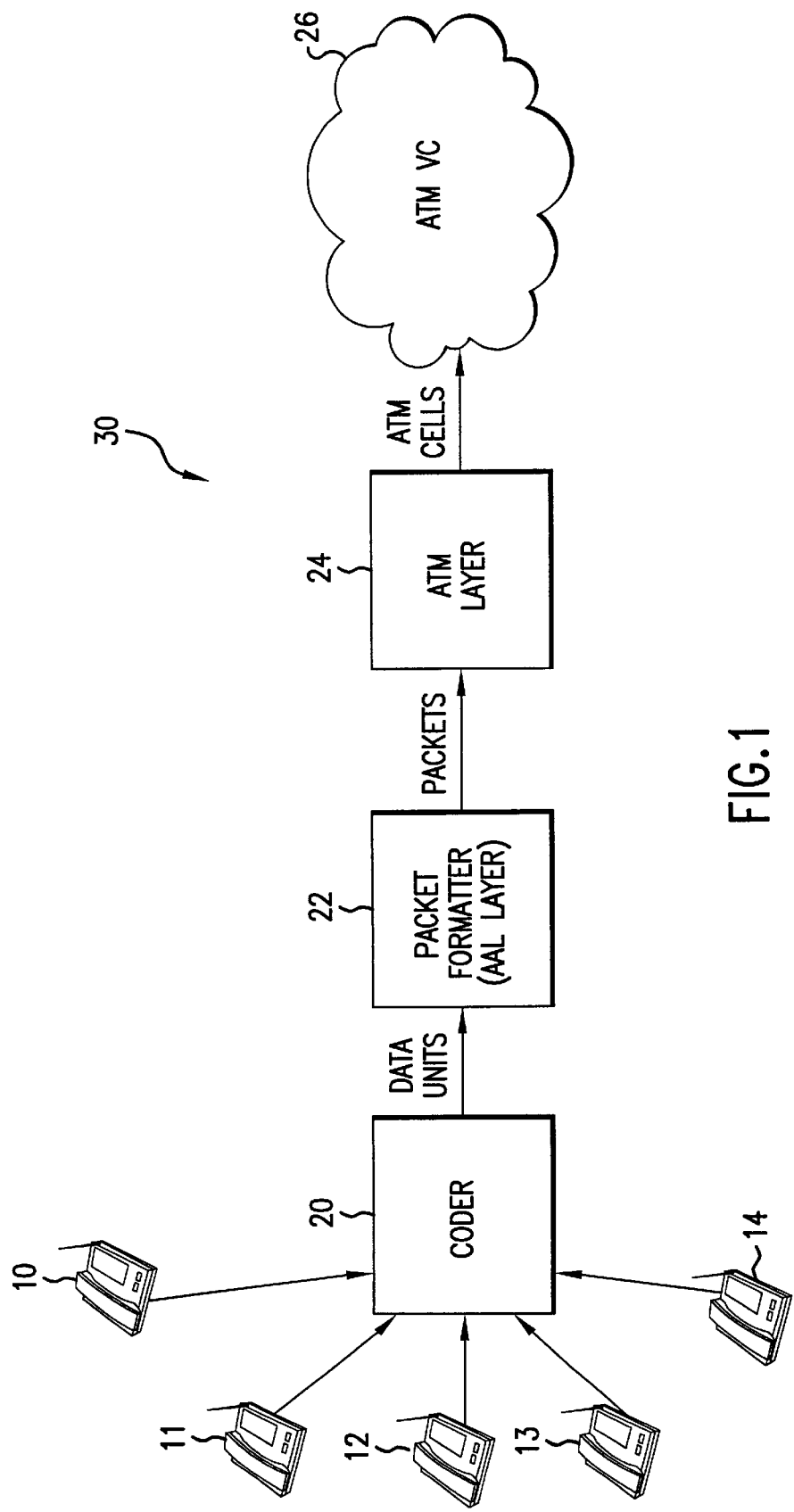
FIG. 1 is a block diagram illustrating one embodiment of an ATM transmission system that includes the present invention.

FIG. 1 is a block diagram illustrating one embodiment of an ATM transmission system 30 that includes the present invention. The system includes a plurality of telephones 10–14 coupled to a coder 20. Telephones 10–14 each transmit an analog voice signal during a telephone call.

The outputs of telephones 10–14 are received by coder 20 which then digitizes the received audio speech. Coder 20 also compresses the voice signals at different compression speeds depending on the amount of voice signals received and the amount of bandwidth available. In one embodiment, coder 20 is a G.728 coder that normally operates at 16 Kbps. However, coder 20 can down-speed in the event of source congestion to 12.8 Kbps and 9.6 Kbps. The digitized data output from coder 20 is in the form of data units. A data unit is based on a fixed time interval. For example, in one embodiment, each data unit consists of a 5 millisecond time interval of compressed voice. This results in the length of a voice data unit of 10, 8 and 6 octets when coder 20 is operating at 16 Kbps, 12.8 Kbps and 9.6 Kbps, respectively. Coder 20 can also output uncompressed speech using ITU G.711 64 Kbps PCM, or output a Silence Insertion Descriptor ("SID") when no outgoing speech is transmitted during a telephone call. The different possible speech outputs of coder 20 (e.g., 64 Kbps, 16 Kbps, 12.8 Kbps, etc.) are referred to as the encoding rules of system 30.

Coder 20 is coupled to packet formatter 22. Packet formatter 22 is part of the AAL layer. Packet formatter 22 formats the received data units into packets that are placed in an ATM cell.

ATM layer 24 receives the packets from packet formatter 24. ATM layer 24 adds a 5 octet header to the packets to form ATM cells. The ATM cells are then transmitted over an ATM virtual channel 26.

Packet formatter 22 requires multiple parameters as inputs. The first parameters are the encoding rules. In one embodiment, the encoding rules are:

G.711 64 Kbps PCM;

G.728 16 Kbps LD-CELP;

G.728 12.8 Kbps LD-CELP;

G.728 9.6 Kbps LD-CELP; and

Silence Insertion Descriptor (SID).

For each encoding rule, the following parameters are specified:

the time interval for the data unit associated with the encoding rule (e.g., 5 milliseconds);

the maximum number of data units in a homogenous packet; and the transfer format of a data unit.

In the present invention, packets generated by packet formatter 22 can be homogenous or mixed mode. A homogenous packet is a packet in which all data units were formed using the same encoding rule. The packet length of a homogenous packet can be determined by multiplying the number of data units by the length of a data unit.

A mixed mode packet is a packet which includes data units formed using different encoding rules. For example, in a packet with four units, one data unit may be formed using 16 Kbps, and three data units may be formed using 9.6 Kbps. For a mixed mode packet, the following parameters are specified:

the maximum number of mixed mode data units that can fit into a packet; and bits patterns that identify the encoding rule used for each data unit.

It is possible that, in some instances, the maximum packet length is reached before the packet contains the maximum number of data units. Of course, when that occurs, the packet is formed and transmitted without the maximum number of data units.

Figure 2:
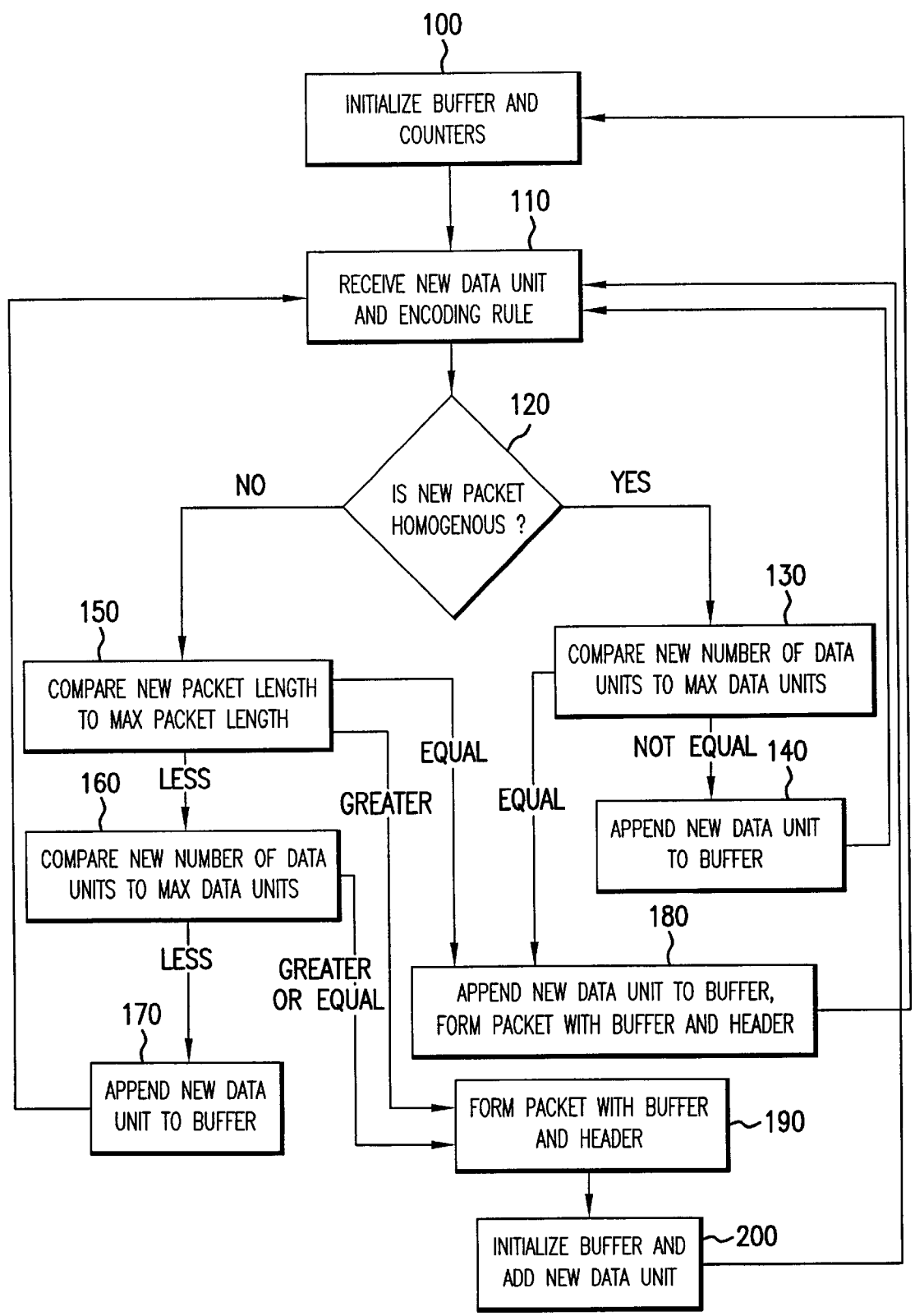
FIG. 2 is a block diagram illustrating steps performed by a packet formatter in accordance with one embodiment of the present invention.

FIG. 2 is a block diagram illustrating steps performed by packet formatter 22 in accordance with one embodiment of the present invention. The steps of FIG. 2 are executed for every data unit output by coder 20.

At step 100, a buffer within packet formatter 22 that holds the received data units is initialized. The buffer is initialized by emptying it so that it does not store any data units. Further, counters are initialized to zero. Counters include the number of data units, and the length of the packet.

At step 110, a new data unit is received from coder 20, included with the data unit is an indication of the encoding rule of the data unit (e.g., 16 Kbps).

At step 120, formatter 22 determines if the "new" packet is homogenous. The new packet consists of the data units already in the buffer plus the new data unit received at step 110. If all of the data units of the new packet have the same encoding rule, then the new packet is homogenous. If all of the data units of the new packet do not have the same encoding rule, then the new packet is not homogenous (i.e., the new packet is mixed mode). Of course, when step 120 is executed for the first time, the new packet will always be homogenous because buffer is empty and the new packet includes only the new data unit.

If the new packet is homogenous, at step 130 the "new" number of data units is compared with the maximum allowable number of data units. The new number of data units consists of the number of data units already in the buffer plus the new data unit (i.e., the data units of the new packet). The maximum number of data units is a fixed parameter that is dependent on the encoding rule of the data units (all data units at step 130 should have the same encoding rule since they are homogenous).

If the new number of data units is not equal to the maximum number of new data units at step 130, the process branches to step 140. A step 140, the new data unit is appended to the data units already in the buffer and the process branches to step 110.

If the new number of data units is equal to the maximum number of data units at step 130, the process branches to step 180. At step 180, the new data unit is appended to the data units already in the buffer and a packet is formed. The packet includes the data units in the buffer and a header. Details on the header are described below. After step 180, the process branches to step 100.

Step 150 is executed if the new packet is not homogenous at step 120. At step 150, the "new" packet length is compared to the maximum packet length. The new packet length is the length of the new packet which includes the data units already in the buffer plus the new data unit. The maximum packet length, or payload, is a fixed parameter and is typically 48 octets minus a 2 or 3 octet header.

If the new packet length is equal to the maximum packet length at step 150, the process branches to step 180.

If the new packet length is greater than the maximum packet length at step 150, the process branches to step 190. At step 190, the packet is formed with the data units already in the buffer and a header. The packet does not include the new data unit. At step 200, the buffer is initialized (i.e., emptied) and the new data unit is then added to the buffer. The process then branches to step 110.

If the new packet length is less than the maximum packet length at step 150, the process branches to step 160. Step 160 is identical to step 130. If at step 160, the number of data units is greater than or equal to the maximum number of data units, the process branches to step 190. If at step 160, the number of data units is less than the maximum number of data units, the process branches to step 170. Step 170 is identical to step 140. After step 170, the process branches back to step 110.

The packet formed by packet formatter 22 includes a plurality of data units and a header. In one embodiment, the header includes at least two pieces of information: the number of data units in the packet, and the encoding rule for each data unit. The header can also include whether the packet is homogenous or mixed mode, the sequence number of the packet, and a CRC. Further, each data unit will be numbered and each packet typically will have a sequence number. The sequence number for a packet is the number of the first data unit in that packet. The sequence number is used by a receiver to detect missing packets and facilitate error recovery.

The following are embodiments of packets generated by the present invention. The first is an AAL2-based embodiment, the second is an AAL5-based embodiment, and the third embodiment is based on a new type of AAL.

AAL2 Based Embodiment

In this embodiment, the basic time interval for the data units is 5 milliseconds. This results in the length of the data units of 10, 8 and 6 octets when coder 20 is operating at 16 Kbps, 12.8 Kbps and 9.6 Kbps, respectively. The silence insertion descriptor is assumed to be 1 octet long.

Each ATM cell contains a single AAL2 packet. Each cell will have 44 octets of usable payload when the one octet pointer field and three octet AAL2 header are subtracted out. Based on the lengths of the different data units, a cell can fit:

4 data units at 16 Kbps (4×10=40 octets);

5 data units at 12.8 Kbps (5×8=40 octets);

7 data units at 9.6 Kbps (7×6=42 octets).

Therefore, every time a homogenous packet is transmitted by packet formatter 22 with an encoding rule of 16 Kbps, the sequence lumber will increase by 4. The increment is 5 and 7 for an encoding rule of 12.8 Kbps and 9.6 Kbps, respectively.

Because the sequence number can be incremented by up to 7 for a packet, the sequence number modulus is selected to be 16, the maximum allowable by AAL2. Further, a type 2 packet, as defined by AAL2, is used. A type 2 packet has a 3 octet header in addition to the AAL2 header. The three octet header for mixed mode packets in one embodiment is encoded as follows:

Bits 1–2: A packet type identifier.

Bits 3–5: The number of data units in the packet, maximum of 5 data units.

Bits 6–15: Two bits are assigned to each data unit as indicated above from first to last. The pattern 00, 01, 10, and 11 indicates that the encoding rule for the data unit is 16 Kbps, 12.8 Kbps and 9.6 Kbps, and silence, respectively.

Bits 16–19: The sequence number.

Bits 20–24: CRC-5.

AAL5 Based Embodiment

An AAL5 packet has an 8 octet trailer, leaving a payload of 40 octets. In this embodiment, with a single packet per ATM cell, and having a basic time interval of 5 milliseconds, a cell can fit:

4 data units at 16 Kbps (4×10=40 octets);

5 data units at 12.8 Kbps (5×8=40 octets);

6 data units at 9.6 Kbps (6×6=36 octets).

In the 8 octet AAL5 trailer, there is one octet of UUI that can be used by packet formatter. Bits 1–3 are used to identify the packet. For example, a "000" can be a homogenous PCM packet, a "001" can be a homogenous 16 Kbps packet, and a "100" can be a mixed mode packet. Each mixed mode packet in one embodiment of the present invention includes an additional two octet header formatted as follows:

Bits 1–4: The number of data units in the packet, maximum of 6 data units.

Bits 5–16: Two bits are assigned to each data unit as indicated above from first to last. The pattern 00, 01, 10, and 11 indicates that the encoding rule for the data unit is 16 Kbps, 12.8 Kbps and 9.6 Kbps, and silence, respectively.

New AAL Embodiment

In this embodiment, AAL2 packets are modified to provide a more efficient packet. First, the start field that is always aligned with the beginning of the cell is deleted. The start field is not needed because in the present invention there is only one packet per ATM cell. The CID field in the AAL2 packet header is also not needed so it is converted to the following usage:

Bit 1: Indicates whether the packet is mixed mode or homogenous.

Bits 2–7: Sequence numbering.

If the mode indicator (bit 1 of the CID field) is set to 0, it indicates that the packet is not a mixed mode speech packet. The UUI field of the packet is then used to classify the packet as either a homogenous speech packet with the encoding rule specified, or as another packet type such as a control and signaling information packet (e.g., an AAL2 type 3 packet).

If the mode indicator is set to 1, it indicates that the packet is a mixed mode speech packet, and the UUI field is used to indicate the number of data units in the packet. The packet payload contains additional overhead which describes the encoding rule of the different data units in the packet. The size of the overhead depends on the maximum number of data units that can appear in a packet and the number of encoding rules that are supported.

In one embodiment, a 3 octet header is chosen. As there are 4 different encoding rules, 2 bits are assigned to specify each data unit as follows:

00 silence 01 16 Kbps 10 12.8 Kbps 11 9.6 Kbps.

Again, the basic interval is 5 milliseconds. With a 3 octet header, the bit allocation scheme is as follows:

| Octet | Bit | Assignment |
|---|---|---|
| 1 | 1–2 | Encoding rule of 1st data unit |
|   | 3–4 | Encoding rule of 2nd data unit |
|   | 5–6 | Encoding rule of 3rd data unit |
|   | 7–8 | Encoding rule of 4th data unit |
| 2 | 1–2 | Encoding rule of 5th data unit |
|   | 3–4 | Encoding rule of 6th data unit |
|   | 5–6 | Encoding rule of 7th data unit |
|   | 7–8 | Encoding rule of 8th data unit |
| 3 | 1–2 | Encoding rule of 9th data unit |
|   | 3 | Reserved |
|   | 4–8 | CRC-5 |

As shown, this embodiment can support up to 9 data units in a mixed mode packet. In contrast, in the AAL2-based embodiment that uses a type 2 packet, only a maximum of 5 data units can be supported in a mixed mode packet.

As disclosed, the present invention transmits compressed voice by forming a mixed mode packet and transmitting one packet per ATM cell. The mixed mode packet allows for down-speeding and up-speeding of the speech signals as well as efficient packing of an ATM cell. Further, limiting the ATM cell to a single packet eliminates the requirement of two-layer switching.

Several embodiments of the present invention are specifically illustrated and/or described herein. However, it will be appreciated that modifications and variations of the present invention are covered by the above teachings and are within the purview of the appended claims without departing from the spirit and intended scope of the invention.

For example, although each described embodiment utilized a G.728 coder, other types of coder can be used in the present invention. In other embodiments, a G.726 coder can be used to include the following encoding rules: G.711 64 Kbps PCM; G.726 32 Kbps ADPCM; G.726 24 Kbps ADPCM; G.726 16 Kbps ADPCM; and Silence Insertion Descriptor (SID).

What is claimed is:

1. A method of transmitting compressed voice packets over asynchronous transfer mode (ATM) comprising the steps of:
   receiving a plurality of voice data units and a plurality of encoding rules, wherein one encoding rule is received for each data unit;
   forming a packet comprising the data units and a header; and
   transmitting the packet within an ATM cell;
   wherein the header comprises;
   an amount of data units in the packet; and
   the encoding rule for each data unit wherein the encoding rules determine a maximum number of data units for the packet.

2. The method of claim 1, wherein the plurality of voice data units and the plurality of encoding rules are received one at a time, said method further comprising:
   for each encoding rule received, determining whether the encoding rule is different from previously received encoding rules.

3. The method of claim 2, further comprising:
   for each data unit received, determining whether a number of data units in a new packet equals a maximum number of data units;
   the packet being formed when the number of data units in the new packet equals the maximum number of data units.

4. The method of claim 2, further comprising:
   for each data unit received, determining whether a length of a new packet is greater than or equal to a maximum packet length;
   the packet being formed when the length of the new packet is greater than or equal to the maximum packet length.

5. The method of claim 1, wherein the ATM cell has at most one packet.

6. The method of claim 1, wherein the plurality of encoding rules include an encoding rule of a first speed and an encoding rule of a second speed.

7. The method of claim 6, wherein the encoding rule of a first speed relates to 16 Kbps voice compression, the encoding rule of a second speed relates to 12.8 Kbps voice compression, the plurality of encoding rules include an encoding rule of a third speed, and the encoding rule of a third speed relates to 9.6 Kbps voice compression.

8. The method of claim 6, the encoding rule of a first speed relates to 32 Kbps voice compression, the encoding rule of a second speed relates to 24 Kbps voice compression, the plurality of encoding rules include an encoding rule of a third speed, and the encoding rule of a third speed relates to 16 Kbps voice compression.

9. The method of claim 6, wherein the plurality of encoding rules further include an encoding rule of silence.

10. The method of claim 1, wherein the packet is an AAL packet.

11. The method of claim 10, wherein the AAL packet is an AAL2 packet.

12. The method of claim 10, wherein the AAL packet is an AAL5 packet.

13. A system for transmitting compressed voice packets over asynchronous transfer mode (ATM) comprising:
   a coder that digitizes voice signals into a plurality of voice data units using a plurality of encoding rules;
   a packet formatter coupled to said coder that forms a packet from the plurality of data units; and
   an ATM layer coupled to said packet formatter that generates an ATM cell from said packet;
   wherein said packet comprises a header, and said header comprises:
   an amount of data units in said packet; and
   the encoding rule for each data unit wherein the encoding rules determine a maximum number of data units for the packet.

14. The system of claim 13, wherein said coder is a G.728 coder.

15. The system of claim 13, wherein said coder is a G.726 coder.

16. The system of claim 13, wherein the ATM cell includes at most one packet.

17. The system of claim 14, wherein the plurality of encoding rules include an encoding rule relating to 16 Kbps voice compression, an encoding rule relating to 12.8 Kbps voice compression, and an encoding rule relating to 9.6 Kbps voice compression.

18. The system of claim 17, wherein the plurality of encoding rules further include an encoding rule relating to silence and an encoding rule relating to 64 Kbps voice compression.

19. The system of claim 13, wherein the packet is an AAL packet.

20. A method of forming an asynchronous transfer mode (ATM) cell, said method comprising the steps of:
   (a) receiving a voice signal;
   (b) determining an amount of available bandwidth;
   (c) forming a voice data unit from the voice signal in accordance with an encoding rule wherein said encoding rule is dependent on the amount of available bandwidth;
   (d) receiving a plurality of voice data units by repeating steps (a)–(c);
   (e) forming a packet from the received data units, said packet comprising a header; and
   (f) forming the ATM cell with said packet:
   wherein the header comprises an amount of data units in the packet and the encoding rule used to form each of the data units in the packet wherein the encoding rules determine a maximum number of data units for the packet.

21. The method of claim 20, wherein the header further includes a sequence number of the packet, and an identifier of a type of packet.

22. The method of claim 21, wherein the type of packet is one of a homogenous packet and a mixed mode packet.

23. The method of claim 20, wherein the ATM cell includes at most one packet.

24. The method of claim 23, wherein the packet is an AAL packet.

25. A method of transmitting compressed voice packets over asynchronous transfer mode (ATM) comprising the steps of:

receiving a plurality of voice data units and a plurality of encoding rules, wherein one encoding rule is received for each data unit;

forming a packet comprising the data units and a header; and transmitting the packet within an ATM cell;

wherein the voice data units and encoding rules are received one at a time, and the header comprises;
an amount of data units in the packet; and
the encoding rule for each data unit;

for each encoding rule received, determining whether the encoding rule is different from previously received encoding rules;

for each data unit received, determining whether a number of data units in a new packet equals a maximum number of data units; and wherein the packet is formed when the number of data units in the new packet equals the maximum number of data units.

26. A method of transmitting compressed voice packets over asynchronous transfer mode (ATM) comprising the steps of:

receiving a plurality of voice data units and a plurality of encoding rules, wherein one encoding rule is received for each data unit;

forming a packet comprising the data units and a header; and transmitting the packet within an ATM cell;

wherein the header comprises;
an amount of data units in the packet; and
the encoding rule for each data unit;

for each encoding rule received, determining whether the encoding rule is different from previously received encoding rules;

for each data unit received, determining whether a length of a new packet is greater than or equal to a maximum packet length;

wherein one packet is formed when the length of the new packet is greater than or equal to the maximum packet length.

27. A method of transmitting compressed voice packets over asynchronous transfer mode (ATM) comprising the steps of:

receiving a plurality of voice data units and a plurality of encoding rules, wherein one encoding rule is received for each data unit;

forming a packet comprising the data units and a header; and transmitting the packet within an ATM cell;

wherein the header comprises;

an amount of data units in the packet; and the encoding rule for each data unit;

wherein the encoding rules comprises a plurality of speeds; and wherein said plurality of speeds comprise 32 Kbps voice compression, 24 Kbps voice compression, 16 Kbps voice compression, 12.8 Kbps voice compression and 9.6 Kbps voice compression.

* * * * *